United States Patent
Beck et al.

(10) Patent No.: US 9,702,393 B2
(45) Date of Patent: Jul. 11, 2017

(54) PRESSURE PAD FOR SCREW AND BREAKAWAY PRESSURE SCREW

(71) Applicant: Hubbell Incorporated, Shelton, CT (US)

(72) Inventors: Alan Douglas Beck, Liberty Township, OH (US); Benjamin Herman Sparks, Hamilton, OH (US); Barry Lynn Baker, Amelia, OH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/872,413

(22) Filed: Oct. 1, 2015

(65) Prior Publication Data
US 2016/0104952 A1    Apr. 14, 2016

Related U.S. Application Data

(60) Provisional application No. 62/058,329, filed on Oct. 1, 2014.

(51) Int. Cl.
*H01R 4/36* (2006.01)
*F16B 31/00* (2006.01)
*F16B 31/02* (2006.01)

(52) U.S. Cl.
CPC ............. *F16B 31/00* (2013.01); *H01R 4/366* (2013.01); *F16B 31/021* (2013.01)

(58) Field of Classification Search
CPC . H01R 4/36; H01R 4/366; F16B 31/00; F16B 31/021
USPC ................ 439/814, 798, 812; 29/863; 411/2
See application file for complete search history.

(56) References Cited

U.S. PATENT DOCUMENTS

| | | | |
|---|---|---|---|
| 2,830,635 A | 4/1958 | Thorstens | |
| 3,498,174 A | 3/1970 | Schuster | |
| 3,622,946 A | 11/1971 | Rogers | |
| 3,865,007 A | 2/1975 | Stanback | |
| 3,963,322 A | 6/1976 | Gryctko | |
| 4,199,216 A | 4/1980 | Gryctko | |
| 5,429,466 A | 7/1995 | Nagayama | |
| 5,494,462 A | 2/1996 | Auclair | |
| 5,713,705 A | 2/1998 | Grunbichler | |
| 6,032,556 A * | 3/2000 | Hu ...................... | B25B 13/481 81/436 |
| 6,080,024 A | 6/2000 | Miller et al. | |
| 6,884,124 B1 | 4/2005 | Luzzi | |
| 7,214,108 B2 | 5/2007 | Barnett | |

(Continued)

FOREIGN PATENT DOCUMENTS

| | | |
|---|---|---|
| GB | 2174851 | 11/1986 |
| WO | 2014000881 | 1/2014 |

OTHER PUBLICATIONS

PCT/US2015/053607 International Search Report and Written Opinion dated Dec. 22, 2015.

*Primary Examiner* — Javaid Nasri
(74) *Attorney, Agent, or Firm* — Michael Best & Friedrich, LLP

(57) ABSTRACT

A fastener used to secure an electrical conductor includes a head, a shaft, and a pressure pad. The head has an inner surface for receiving a drive tool. The shaft has an outer surface including a threaded portion. The pressure pad can include a surface feature. The pressure pad can also be releasably, rotationally-fixed to the shaft through a breakaway portion.

26 Claims, 4 Drawing Sheets

(56) References Cited

U.S. PATENT DOCUMENTS

| | | | |
|---|---|---|---|
| 7,387,547 B1* | 6/2008 | Fuzetti | H01R 4/363 |
| | | | 439/798 |
| 7,758,356 B2 | 7/2010 | Burris et al. | |
| 7,775,754 B2 | 8/2010 | Calandra et al. | |
| 8,317,443 B2 | 11/2012 | Stauch et al. | |
| 2009/0053940 A1 | 2/2009 | Sweeney et al. | |
| 2009/0075526 A1 | 3/2009 | King, Jr. et al. | |
| 2012/0276789 A1 | 11/2012 | Battle | |
| 2012/0328388 A1 | 12/2012 | Hardt et al. | |

* cited by examiner

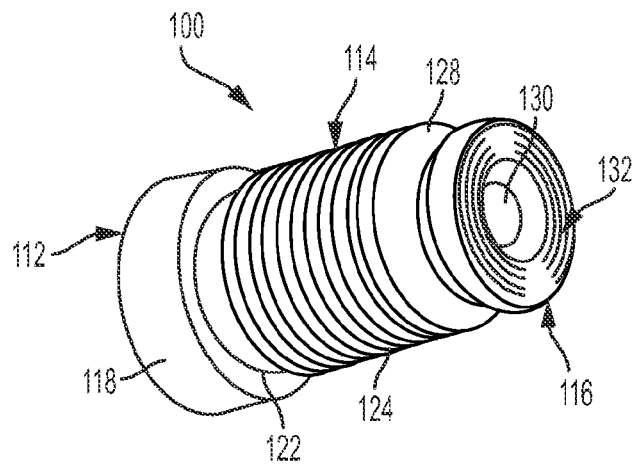
FIG. 5
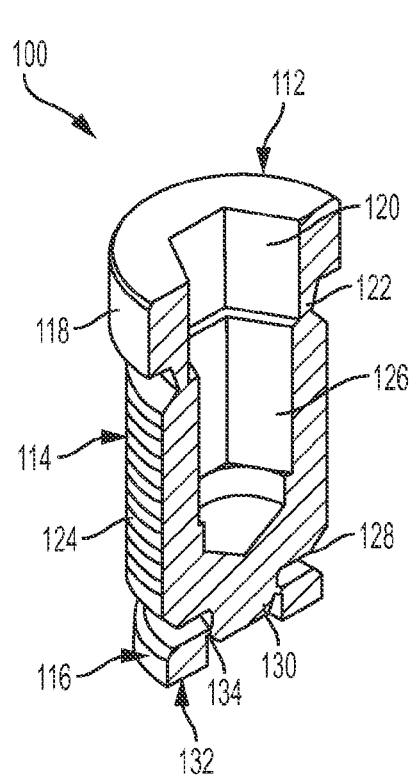 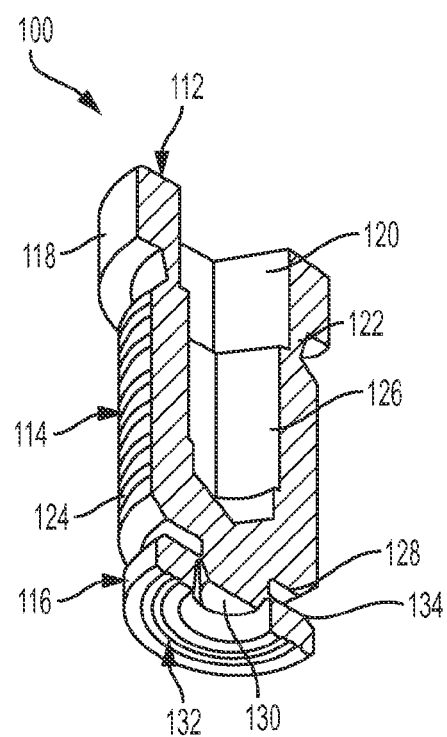
FIG. 6  FIG. 7

PRESSURE PAD FOR SCREW AND BREAKAWAY PRESSURE SCREW

RELATED APPLICATIONS

This application is based on provisional application Ser. No. 62/058,329, filed Oct. 1, 2014, the disclosure of which is incorporated herein by reference in its entirety.

FIELD

Various exemplary embodiments discussed herein are directed to a pressure pad for a fastener and also to shearable fasteners having one or more breakaway features.

BACKGROUND

Electrical connectors are used in a variety of environments to connect and transfer electrical power to or from one or more conductors. A primary and one or more tap conductors are physically and electrically connected to a structure, such as a distribution block, terminal lug, splice, or other connector. Power is transferred from the primary conductor to the tap conductors. Certain connectors utilize a fastener to apply a compression force to attach and retain a conductor.

SUMMARY

According to an exemplary embodiment, a fastener includes a head, a shaft, and a pressure pad. The head has an inner surface for receiving a drive tool. The shaft has an outer surface that includes a threaded portion. The pressure pad has a surface feature for contacting a conductor.

According to another exemplary embodiment, a fastener includes a head, a shaft, and a pressure pad. The head has an inner surface with a first socket for receiving a drive tool. The shaft has an outer surface with a threaded portion. The press pad has a breakaway portion with a torque limit connecting the pressure pad to the shaft.

According to another exemplary embodiment, a fastener includes a head having an inner surface with a first socket for receiving a drive tool and a shaft having an outer surface including a threaded portion. A shearable section is positioned between the head and the shaft. The shearable section has a first torque limit. A pressure pad has a surface feature and a breakaway portion with a second torque limit connecting the pressure pad to the shaft.

According to another exemplary embodiment, an electrical connector includes a body having a first aperture for receiving a conductor and a second aperture having a thread for receiving a fastener. A fastener positioned in the second aperture. The fastener includes a head having an inner surface with a first socket for receiving a drive tool and a shaft having an outer surface with a threaded portion. A shearable section is positioned between the head and the shaft having a first torque limit. The fastener also includes a pressure pad having a surface feature and a breakaway portion with a second torque limit connecting the pressure pad to the shaft.

Further exemplary embodiments include a method of securing a conductor to an electrical connector. A conductor is placed into a first aperture of an electrical connector having a fastener positioned in a second aperture. The fastener includes a head having an inner surface with a first socket for receiving a drive tool, a shaft having a threaded portion, a shearable section positioned between the head and the shaft having a first torque limit, and a pressure pad having a surface feature and a breakaway portion with a second torque limit less than the first torque limit rotatably fixing the pressure pad to the shaft. The fastener is rotated until the second torque limit is reached, fracturing the breakaway portion and allowing the pressure pad to rotate with respect to the shaft. The fastener is further rotated until the first torque limit is reached, separating the head from the shaft.

BRIEF DESCRIPTION OF THE DRAWINGS

The aspects and features of various exemplary embodiments will be more apparent from the description of those exemplary embodiments taken with reference to the accompanying drawings, in which:

FIG. 5 is a perspective view of another exemplary breakaway screw;

FIG. 6 is a sectional view of the screw shown in FIG. 5 taken along a plane extending along the longitudinal axis of the screw;

FIG. 7 is another sectional view of the screw shown in FIG. 5 taken along a plane extending along the longitudinal axis of the screw;

DETAILED DESCRIPTION OF EXEMPLARY EMBODIMENTS

Figure 1:
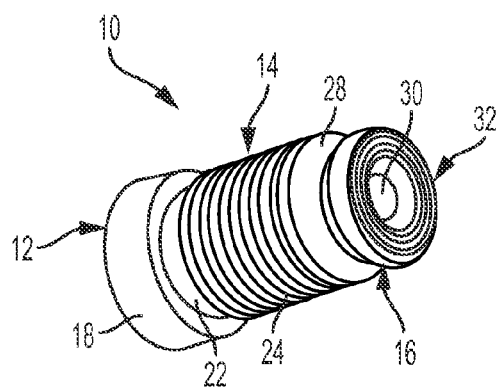
FIG. 1 is a perspective view of an exemplary breakaway screw.

An electrical connector may utilize a fastener to attach and retain a conductor. Examples of such connectors may include, but are not limited to, distribution blocks that receive one or more primary conductors and one or more tap conductors and lug connectors having an opening for receiving a conductor and a pad for attaching the connector to a structure. These connectors have one or more openings to receive the conductors and utilize a fastener extending into the opening to connect and retain the conductor. Proper attachment of the conductor provides a secure connection and efficient electrical power transfer.

FIGS. 1-4 show an exemplary embodiment of a fastener 10 having a head 12, a shaft 14, and a pressure pad 16. The fastener 10 is depicted as an integral structure although the head 12, shaft 14 and pressure pad 16 may be made of different components that are connected or attached to one another. Any suitable process or machining may be used to form the fastener 10, for example through molding or casting and any suitable material may be used, for example metal. The fastener 10 may be rated for use with various conductors, for example aluminum and copper conductors. FIGS. 5-9 depict another exemplary embodiment of a fastener 100. For brevity, certain similar aspects of the first and second exemplary fasteners 10, 100 are only described once, with similar parts having a similar numbering designation.

The head 12 has a head outer surface 18 and a head inner surface 20. Both, or one of, the head outer and inner surfaces 18, 20 are designed to mate with a tool, for example a driver or wrench. In the exemplary embodiment shown in FIGS. 1-4, the head inner surface 20 is a socket designed to receive a hex or Allen type wrench or driver, although the fastener 10 can be configure to work with any type of socket and tool configuration.

The head 12 is integrally or otherwise connected to the shaft 14 by a shearable section 22. The shearable section 22 is a weakened area compared to the head 12 and the shaft 14 and is designed to rupture, allowing the head 12 to separate from the shaft 14 when a certain rotational torque limit is reached substantially relative to the longitudinal axis of the screw. In an exemplary embodiment, the shearable section 22 is weakened due to a reduced wall thickness. The reduced wall thickness may be formed through machining such as milling, turning, laser etching, etc. The reduced wall thickness may also be formed through a molding or casting process. The diameter and wall thickness of the shearable section 22 can be altered depending on the material of the fastener 10 and the desired torque limit. The size or strength of the shearable section 22 is dependent on the application and desired torque limit and begins to shear upon application of torque on the screw exceeding the torque limit. The inner surface of the shearable section 22 may be continuous with the head inner surface 20, having the same size and shape, or it may have a different configuration, such as a cylindrical surface.

In various alternative embodiments, the shearable section 22 includes a frangible connection formed by openings, perforations, or deformations. More than one shearable section 22 may also be provided to allow shearing of the fastener at different lengths. Multiple shearable sections 22 can also have different torque limits.

The shaft 14 includes a shaft outer surface 24, a shaft inner surface 26, a shaft bottom surface 28, and a protrusion 30. The shaft outer surface 24 includes a threaded portion. The shaft inner surface 26 includes a surface designed to mate with a tool, for example a socket designed to mate with a hex wrench. In an exemplary embodiment, the shaft inner surface 26 is sized or configured differently than the head inner surface 20. As best shown in the sectional views, and according to an exemplary embodiment, the shaft inner surface 26 is smaller than the head inner surface 20. This prevents a user from inadvertently placing a tool into the shaft 14 and over tightening the fastener 10, while still allowing for removal of the fastener 10 after the head 12 has been separated from the shaft 14. The shaft inner surface 26 can also be configured to mate with a different tool.

In an exemplary embodiment, the pressure pad 16 has a substantially circular cross-section and is rotatably connected to the shaft protrusion 30. The pressure pad 16 has a bottom surface for contacting a conductor as the fastener 10 is tightened. When the friction between the pressure pad 16 and the conductor overcomes the friction in the rotatable connection between the pressure pad 16 and the protrusion 30, the shaft 14 rotates independently of the pressure pad 16, which does not rotate with respect to the conductor. The independently rotatable pressure pad 16 helps prevent the fastener 10 from grinding into the conductor and damaging individual conductor strands, especially when used with flex conductors.

In an exemplary embodiment, the bottom surface of the pressure pad has one or more surface features 32. The surface features 32 may include, but are not limited to, protrusions, grooves, channels, a knurled surface, or any textured, patterned, or rough surface of increased rotational friction. FIGS. 1-4 depict an exemplary embodiment where the surface features 32 are serrations and FIGS. 5-9 depict an exemplary embodiment where the surface features 132 are rounded grooves. Circumferential surface features 32, 132 are shown in FIGS. 1-9, although various alternative embodiments may utilize radially extending surface features. Other exemplary embodiments may also utilize a textured or patterned surface extending uniformly or non-uniformly over the entire surface of the pressure pad 16 or a portion of the pressure pad 16.

The pressure pad 16 surface features 32, 132 engage a conductor as the fastener 10 is tightened. The surface features 32, 132 can clean oxidation or other surface impurities from the conductor, exposing fresh metal for an improved electrical connection. The surface features 32, 132 can act on the conductors during an initial rotation that is prior to the level of friction which causes the pressure pad 16 to rotate freely with respect to the shaft 14, during compression of the conductors after the pressure pad 16 rotates freely with respect to the shaft 14, or both. The surface features 32, 132 can also at least partially embed into the conductor, improving the electrical connection. Various embodiments and types of fasteners can utilize the surface features 32, 132, including those that do not utilize a shearable section 22 or a rotational pressure pad 16.

Figure 2:
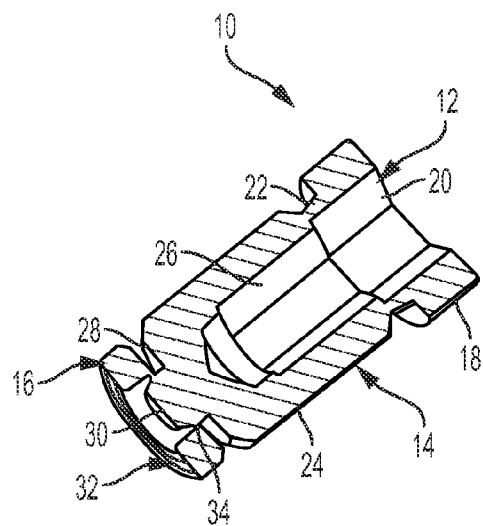
FIG. 2 is a sectional view of FIG. 1 taken along a plane extending along the longitudinal axis of the screw.
Figure 3:
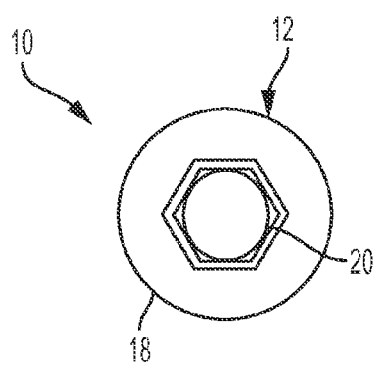
FIG. 3 is top view of the screw shown in FIG. 1.
Figure 4:
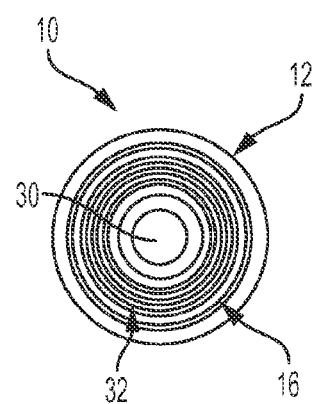
FIG. 4 is a bottom view of the screw shown in FIG. 1.

In an exemplary embodiment, the pressure pad 16 is initially rotationally fixed to the shaft through a breakaway portion 34. The breakaway portion 34 is a weakened area compared to the pressure pad 16 and the protrusion 30, and is designed to rupture when a certain torque limit is reached, allowing the pressure pad 16 to rotate freely with respect to the shaft. In various exemplary embodiments, a weakened area, shearable section or other frangible connection is used to form the breakaway portion 34. As best shown in FIGS. 2, 6, and 7, the exemplary breakaway portion 34 is an area of reduced thickness forming a web connecting the pressure pad 16 to the protrusion 30. The reduced thickness may be formed through machining such as milling, turning, laser etching, etc. The reduced thickness may also be formed through a molding or casting process. The diameter and wall thickness of the breakaway portion 34 can be altered depending on the material of the fastener 10 and the desired torque limit. In various alternative embodiments, the breakaway portion 34 includes a frangible connection formed by openings, perforations, or deformations.

Figure 8:
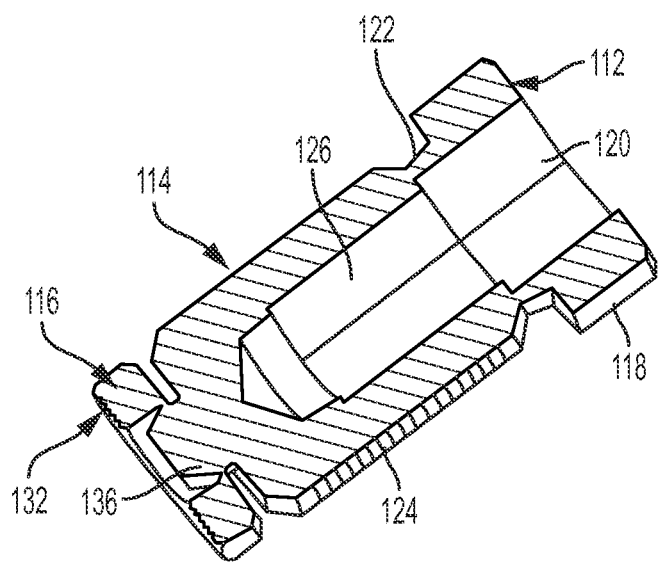
FIG. 8 is another sectional view of the screw shown in FIG. 5 taken along a plane extending along the longitudinal axis of the screw with the pressure pad sheared from the shaft.
Figure 9:
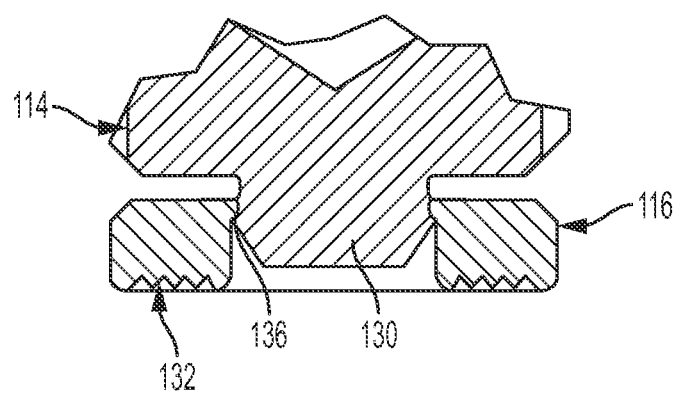
FIG. 9 is an enlarged elevational view in of the pressure pad area of the screw shown in FIG. 8.

In exemplary embodiments utilizing a breakaway portion 134, the pressure pad 116 rotates with the head 112 and shaft 114 until a predetermined torque limit is reached. After the torque limit is surpassed, the breakaway portion 134 ruptures and the pressure pad 116 separates from the shaft protrusion 130. As best shown in FIGS. 8 and 9, a burr 136 is created on the protrusion 130 that prevents the pressure pad 116 from fully detaching from the fastener 100 but allows it to freely rotate. The head 112 and shaft 114 are then tightened further, increasing the downward pressure on the conductor, with minimal or no rotation of the pressure pad 116 with respect to the conductor. The free rotation of the pressure pad 116 with respect to the shaft 114 assists in preventing damage to the conductors, for example through crushing, splaying and breaking of the conductors that could cause an inferior connection.

The pressure pad 116 surface features 132 engage the conductors as the fastener 100 is tightened. Prior to the initial break of the pressure pad 116 from the protrusion 130, the surface features 132 can clean oxidation or other surface impurities from the conductor, exposing fresh metal for an improved electrical connection. The surface features 132 can also at least partially embed into the conductor, improving the electrical connection. Various embodiments and types of fasteners can utilize the surface features 132, including those that do not utilize a shearable section 122, a breakaway portion 134, or a rotational pressure pad 116.

After the pressure pad 116 has been disconnected from the shaft 114, the fastener 100 is tightened until the torque limit of the shearable section 122 between the head 112 and the shaft 114 is exceeded and the head 112 separates from the shaft 114. According to the exemplary embodiment, the torque limit of the breakaway portion 134 is less than the torque limit of the shearable portion 122.

Use of the shearable portion 122 and the breakaway portion 134 allows a user to form a secure connection while helping to prevent over tightening. The fastener 100 also eliminates the need to use special torque wrenches to prevent over tightening in a specific application. The torque limit of the shearable portion 122 and the breakaway portion 134 can be set for different sizes and types of conductors.

Figure 10:
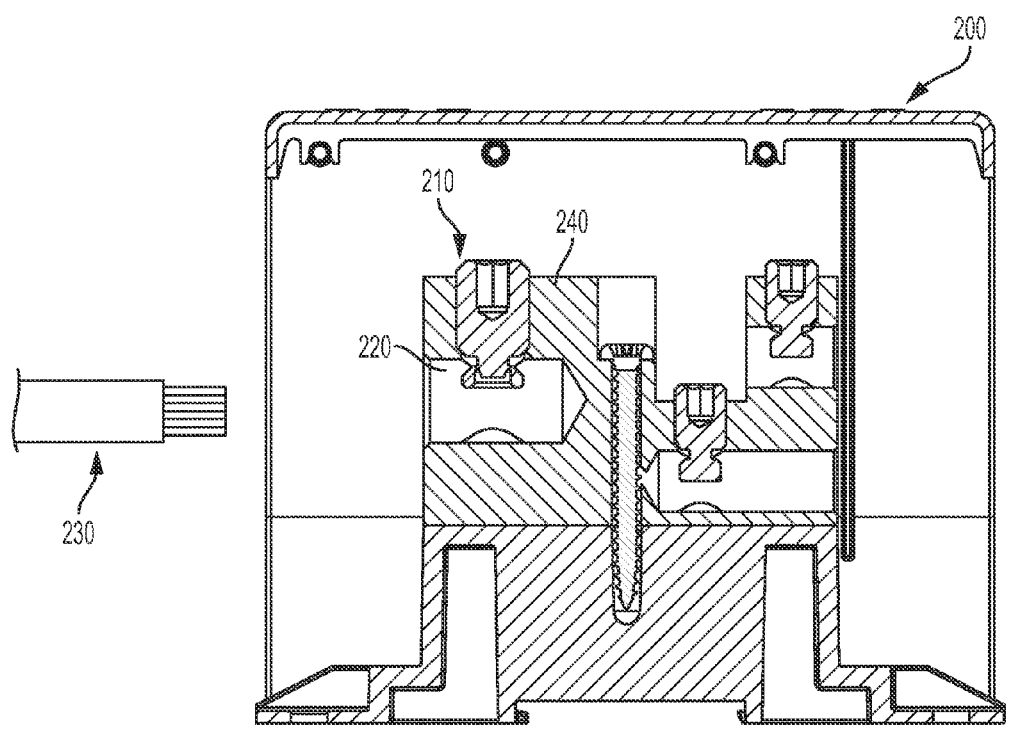
FIG. 10 is a side, sectional view of an exemplary conductor block with a pressure pad screw and a conductor.

FIG. 10 depicts an exemplary embodiment of a connector block 200 utilizing one or more pressure pad screws 210. The pressure pad screw 210 can have any combination of a shearable portion 122, surface features 132, a breakaway portion 134, and one or more of the additional features described herein. The connector block 200 includes a first aperture 220 for receiving a conductor 230. The pressure pad screw 210 is threadably connected to a second aperture 240 and is tightened to retain the conductor 230 in the first aperture 220.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A fastener comprising:
    a head having an inner surface for receiving a drive tool;
    a shaft having an outer surface including a threaded portion; and
    a pressure pad having a surface feature for contacting a conductor, wherein the surface feature comprises at least one serration.

2. The fastener of claim 1, wherein the surface feature extends circumferentially around the pressure pad.

3. The fastener of claim 1, wherein the surface feature extends radially from a portion of said pressure pad.

4. The fastener of claim 1, wherein the surface feature comprises a textured surface.

5. The fastener of claim 1, wherein the pressure pad is rotatably connected to the shaft.

6. The fastener of claim 1, wherein the pressure pad includes a breakaway portion with a torque limit connecting the pressure pad to the shaft.

7. The fastener of claim 6, wherein the pressure pad is rotatably fixed to the shaft prior to the torque limit being exceeded and the pressure pad is rotatably connected to the shaft after the torque limit is exceeded.

8. A fastener comprising:
    a head having an inner surface including a first socket for receiving a drive tool;
    a shaft having an outer surface including a threaded portion; and
    a pressure pad having a breakaway portion with a torque limit connecting the pressure pad to the shaft, wherein the pressure pad is rotatably fixed to the shaft prior to the torque limit being exceeded and the pressure pad is rotatably connected to the shaft after the torque limit is exceeded.

9. The fastener of claim 8, further comprising a shearable section positioned between the head and the shaft having a second torque limit.

10. The fastener of claim 9, wherein the second torque limit is greater than the first torque limit.

11. The fastener of claim 8, wherein the breakaway portion forms a burr on the shaft after the torque limit has been exceeded.

12. The fastener of claim 8, wherein the pressure pad includes a surface feature.

13. A fastener comprising:
    a head having an inner surface including a first socket for receiving a drive tool;
    a shaft having an outer surface including a threaded portion;
    a shearable section positioned between the head and the shaft having a first torque limit; and
    a pressure pad having a surface feature and a breakaway portion with a second torque limit connecting the pressure pad to the shaft, wherein the shaft includes an inner surface for receiving a drive tool.

14. An electrical connector comprising:
    a body having a first aperture for receiving a conductor and a second aperture having a thread for receiving a fastener; and
    a fastener positioned in the second aperture including a head having an inner surface including a first socket for receiving a drive tool, a shaft having an outer surface including a threaded portion, a shearable section positioned between the head and the shaft having a first torque limit, and a pressure pad having a surface feature and a breakaway portion with a second torque limit connecting the pressure pad to the shaft, wherein the pressure pad is rotatably fixed to the shaft prior to the torque limit being exceeded and the pressure pad is rotatably connected to the shaft after the torque limit is exceeded.

15. A fastener comprising:
    a head having an inner surface for receiving a drive tool;
    a shaft having an outer surface including a threaded portion; and a pressure pad having a surface feature for contacting a conductor, wherein the surface feature comprises at least one rounded groove.

16. The fastener of claim 15, wherein the surface feature extends circumferentially around the pressure pad.

17. The fastener of claim 15, wherein the surface feature extends radially from a portion of said pressure pad.

18. The fastener of claim 15, wherein the pressure pad is rotatably connected to the shaft.

19. The fastener of claim 15, wherein the pressure pad includes a breakaway portion with a torque limit connecting the pressure pad to the shaft.

20. The fastener of claim 19, wherein the pressure pad is rotatably fixed to the shaft prior to the torque limit being exceeded and the pressure pad is rotatably connected to the shaft after the torque limit is exceeded.

21. A fastener comprising:
a head having an inner surface for receiving a drive tool;
a shaft having an outer surface including a threaded portion; and
a pressure pad having a surface feature for contacting a conductor,
wherein the pressure pad includes a breakaway portion with a torque limit connecting the pressure pad to the shaft, and wherein the pressure pad is rotatably fixed to the shaft prior to the torque limit being exceeded and the pressure pad is rotatably connected to the shaft after the torque limit is exceeded.

22. The fastener of claim 21, wherein the surface feature comprises at least one serration.

23. The fastener of claim 21, wherein the surface feature comprises at least one rounded groove.

24. The fastener of claim 21, wherein the surface feature extends circumferentially around the pressure pad.

25. The fastener of claim 21, wherein the surface feature extends radially from a portion of said pressure pad.

26. The fastener of claim 21, wherein the surface feature comprises a textured surface.

* * * * *